US009038951B2

(12) United States Patent
Coulter et al.

(10) Patent No.: US 9,038,951 B2
(45) Date of Patent: May 26, 2015

(54) COUPLING ASSEMBLY (75) Inventors: Steven Coulter, Bristol (GB); Paul Hadley, Bristol (GB); Geraint Hopkins, Bristol (GB)

(73) Assignee: Airbus Operations Limited, Bristol (GB)

( * ) Notice: Subject to any disclaimer, the term of this patent is extended or adjusted under 35 U.S.C. 154(b) by 459 days.

(21) Appl. No.: 13/138,678

(22) PCT Filed: Mar. 31, 2010

(86) PCT No.: PCT/GB2010/050552
§ 371 (c)(1),
(2), (4) Date: Sep. 19, 2011

(87) PCT Pub. No.: WO2010/116168
PCT Pub. Date: Oct. 14, 2010

(65) Prior Publication Data
US 2012/0006942 A1    Jan. 12, 2012

(30) Foreign Application Priority Data

Apr. 6, 2009   (GB) .................................. 0905818.1

(51) Int. Cl.
*B64C 3/28* (2006.01)
*F16B 5/02* (2006.01)

(52) U.S. Cl.
CPC ................. *B64C 3/28* (2013.01); *Y10T 403/19* (2015.01); *Y10T 29/49947* (2015.01); *F16B 5/025* (2013.01)

(58) Field of Classification Search
CPC ................. B64C 1/12; B64C 3/28; B64C 9/02
USPC .............. 244/119, 123.1, 123.14, 123.8, 131, 244/132
See application file for complete search history.

(56) References Cited

U.S. PATENT DOCUMENTS

| 4,213,587 A * | 7/1980 | Roeseler et al. ............... 244/213 |
| 2008/0258008 A1* | 10/2008 | Cooper ......................... 244/131 |
| 2010/0096505 A1* | 4/2010 | De Freitas et al. ......... 244/129.5 |

FOREIGN PATENT DOCUMENTS

| CN | 101230874 A | 7/2008 |
| EP | 1 503 096 | 2/2005 |

(Continued)

OTHER PUBLICATIONS

Chinese First Office Action issued Aug. 26, 2013 in CN 201080015978.5 and English Translation.

(Continued)

*Primary Examiner* — Philip J Bonzell
*Assistant Examiner* — Nicholas McFall
(74) *Attorney, Agent, or Firm* — Nixon & Vanderhye P.C.

(57) ABSTRACT

A coupling assembly for joining a first component to a second component, the assembly comprising a shaft for connecting to a first component, and a bracket including a mounting plate for connecting to a second component. The bracket has a bracket arm extending from the mounting plate, and a head having a through-bore on the bracket arm. The shaft is received in the through-bore. A setting device acts between the head and the shaft for setting of the position of the shaft with respect to the head in the axial direction of the shaft. The assembly further includes one or more spherical bearing surfaces, which permit self-alignment of the setting device to accommodate tilting of the shaft with respect to the head about a central point in two orthogonal directions. Also, a joint comprising a first component joined to a second component by one or more of the coupling assemblies. Also, a method of forming a joint using one or more of the coupling assemblies.

18 Claims, 7 Drawing Sheets

(56) References Cited

FOREIGN PATENT DOCUMENTS

| | | |
|---|---|---|
| FR | 2 731 198 | 9/1996 |
| GB | 743267 | 1/1956 |
| GB | 804392 | 11/1958 |
| RU | 2 192 990 | 11/2002 |
| WO | WO 98/06917 | 2/1998 |

OTHER PUBLICATIONS

International Search Report for PCT/GB2010/050552, mailed Dec. 1, 2010.
Written Opinion for PCT/GB2010/050552, mailed Dec. 1, 2010.
Search Report for GB 0905818.1, dated Jul. 29, 2009.
Chinese Search Report dated Aug. 15, 2013 in CN 2010800159785.

* cited by examiner

COUPLING ASSEMBLY

This application is the U.S. national phase of International Application No. PCT/GB2010/050552 filed 31 Mar. 2010 which designated the U.S. and claims priority to GB Patent Application No. 0905818.1 filed 6 Apr. 2009, the entire contents of each of which are hereby incorporated by reference.

FIELD OF THE INVENTION

The present invention relates to a coupling assembly for joining components together. The invention also relates to a joint formed using the coupling assembly and a method of forming such a joint.

BACKGROUND OF THE INVENTION

Figure 1:
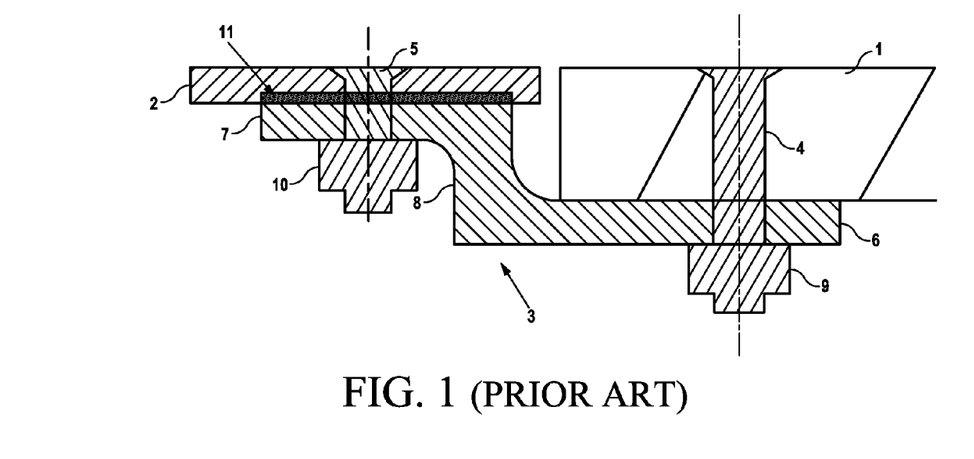
FIGS. 1 and 2 illustrate conventional butt-strap arrangements.
Figure 2:
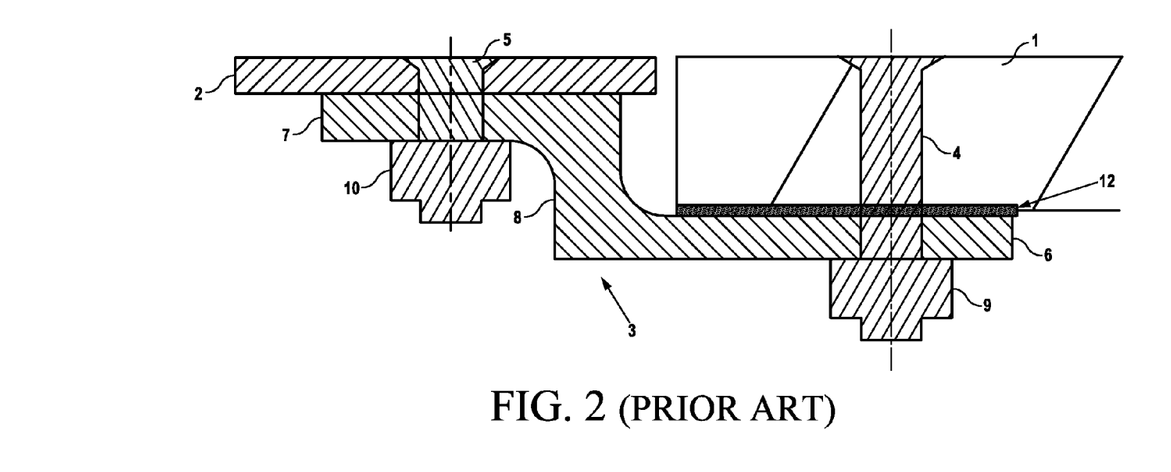

Conventional aircraft wings comprise a wing box with front and rear spars. Upper and lower wing covers are attached to the spars and extend between them to form the upper and lower boundaries of the wing box. Leading and trailing edge structures, such as panels or D-nose covers, are typically attached to the upper and lower covers with butt-straps. FIGS. 1 and 2 illustrate conventional butt-strap arrangements.

An upper wing cover 1 is attached to a fixed leading edge structure 2 with a butt-strap 3, a pair of bolts 4, 5 and nuts 9, 10. The butt-strap 3 comprises upper and lower horizontal portions 6, 7 which are joined by a vertical portion 8. The lower portion 6 engages with the internal surface of the cover 1, while the upper portion 7 engages with the internal surface of the fixed leading edge structure 2.

To achieve a smooth aerodynamic surface, the external surface of the structure 2 and the external surface of the cover 1 must be aligned with each other within a strict tolerance range. To ensure that the alignment criteria are met, a packer 11 may be added between the internal surface of the structure 2 and the upper portion 7 of the butt-strap, as shown in FIG. 1. Alternatively, as shown in FIG. 2, a packer 11 may be added between the internal surface of the cover 1 and the lower portion 6 of the butt-strap. However, as the butt-straps 3 are typically fitted in various strips across the whole span of the wing, this process can be difficult and time consuming. It may also be necessary to hand fettle the structure 2 to match the cover 1 during assembly. This adds further complexity to the process. In addition, loads can only be channelled from the structure 2 into the spar (not shown) via the cover 1.

SUMMARY OF THE INVENTION

A first aspect of the invention provides a coupling assembly for joining a first component to a second component, the assembly comprising:
  a shaft for connecting to a first component;
  a bracket including a mounting plate for connecting to a second component, a bracket arm extending from the mounting plate, and a head having a through-bore on the bracket arm, the shaft being received in the through-bore; and
  a setting device operable to act between the head and the shaft for setting of the position of the shaft with respect to the head in the axial direction of the shaft,
  wherein the assembly includes one or more spherical bearing surfaces, which permit self-alignment of the setting device to accommodate tilting of the shaft with respect to the head about a central point in two orthogonal directions.

A second aspect of the invention provides a joint comprising a first component joined to a second component by one or more coupling assemblies according to the first aspect.

A third aspect of the invention provides a method of forming a joint according to the second aspect, the method comprising:
  connecting the shaft to the first component;
  connecting the mounting plate of the bracket to the second component;
  inserting the shaft in the through-bore of the bracket head; and
  adjusting and setting the position of the shaft with respect to the head in the axial direction of the shaft,
  whereby the one or more spherical bearing surfaces permit self-alignment of the setting device to accommodate tilting of the shaft with respect to the head about a central point in two orthogonal directions.

The coupling assembly is advantageous in that thickness tolerances in the first or second components can be accommodated through adjustment of the axial position of the shaft with respect to the head and setting a desired position by the setting means. The coupling assembly is also advantageous in that angularity between the connection surfaces of the first and second components can be accommodated by the spherical bearing surface(s). The coupling assembly can be standardised for joining a variety of different components, thus reducing the number of parts required in comparison with bespoke butt-straps and associated packers etc.

The spherical bearing surface may take a variety of forms. For example, a spherical recess may be formed in the bracket head around the periphery of the bore on one or each end of the bore, the recess having the spherical bearing surface. Alternatively, a spherical washer may be received on the head around the periphery of the bore on one or each end of the bore, the spherical washer having the spherical bearing surface. In a preferred embodiment, the head has the recess formed around one end of the bore, and the head receives the spherical washer around the other end of the bore. In a further alternative example, a spherical bearing is received in the bore and held in place by a bearing clip, the spherical bearing having the spherical bearing surface and an inner through-bore which receives the shaft.

The setting device may also take a variety of forms. For example, the setting device may be one or more nuts threadably received on the shaft. In the preferred embodiment, the assembly includes spherical nuts which engage the spherical recess formed around one end of the bore, and the spherical washer received around the other end of the bore. Where a spherical recess is formed around each end of the bore, a corresponding pair of spherical nuts may be used. Where a spherical washer is received around each end of the bore, a corresponding pair of spherical nuts may be used. Where a spherical bearing is captured within the head, a pair of standard (non-spherical) nuts may be used as the setting device which engage flat surfaces of the spherical bearing around its inner through-bore. As an alternative to threaded nuts, the setting device may comprise a collar and a pin disposed through the collar and a hole formed in the shaft, substantially perpendicular to the shaft axis. The hole in the shaft may be drilled following adjustment of the shaft to a desired position with respect to the head, prior to pinning. In this alternative example, the shaft would not need to be threaded.

The bracket mounting plate preferably has one or more fixing holes for receiving respective fasteners for connecting to the second component. The fasteners may be bolts, for example, secured through the bracket mounting plate and the second component. The mounting plate can take virtually any form, depending on the local geometry of the second component where the bracket is to be connected. For example, if the bracket is to be connected onto a panel, the mounting plate may be planar. If the bracket is to be connected into or around a corner, the mounting plate may be L-shaped. If the bracket is to be connected to a rounded surface, the mounting plate may be appropriately curved to match the local geometry.

The shaft may be that of a bolt, the bolt having a head which may be used to connect the shaft to the first component. Alternatively, the shaft may be integrally formed with a second mounting plate for connecting to the first component. The shaft may be connected to the first component directly, or an intermediate component may be used. For example, the bolt head or mounting plate may be fixed to a mounting strip, which is in turn fixed to the first component.

The coupling assembly may be used in a variety of applications to create a joint. In a preferred embodiment, the coupling assembly is used to join an aircraft wing trailing edge panel to a wing cover, in place of a conventional butt-strap. The aerodynamic surface of the panel and of the cover should abut and lie substantially flush to meet aerodynamic tolerance requirements. Typically, the manufacturing thickness tolerance of these components is greater than the aerodynamic tolerance of the abutting components. Using the coupling assembly, the axial position of the shaft with respect to the head can be adjusted and set to meet the aerodynamic tolerance requirement. It is common for the wing cover to have a varying thickness, so as to create a ramp, in the span-wise direction due to the variation in wing loading across the wing. Using the coupling assembly, the shaft is able to tilt with respect to the head to "wash out" this angularity between the connecting surface of the cover and the panel. The coupling assembly may therefore be used to effectively join the wing panel and cover so as to meet stringent aerodynamic tolerance requirements.

The coupling assembly may also to be used to join other aircraft components, most typically components which have surfaces which form aerodynamic surfaces of the aircraft. Examples include: the joint between a fixed leading edge panel and a cover of a vertical tail plane, a horizontal tail plane, or a wing; the joint between a trailing edge panel and a cover of a vertical tail plane, or a horizontal tail plane; the joints between a wing cover and a wing tip; and joints in a landing gear bay. The coupling assembly may also be used to join non aircraft components such as for joining a panel to a building structure.

BRIEF DESCRIPTION OF THE DRAWINGS

Embodiments of the invention will now be described with reference to the accompanying drawings, in which:

FIG. 11a illustrates the bracket of the fourth embodiment viewed from beneath; 11b illustrates the view from above; 11c illustrates an exploded view; 11d is a plan view; and 11e is a section view on B-B; and 11f is a section cut on B-B;

DETAILED DESCRIPTION OF EMBODIMENTS

Figures 3, 5, 6:
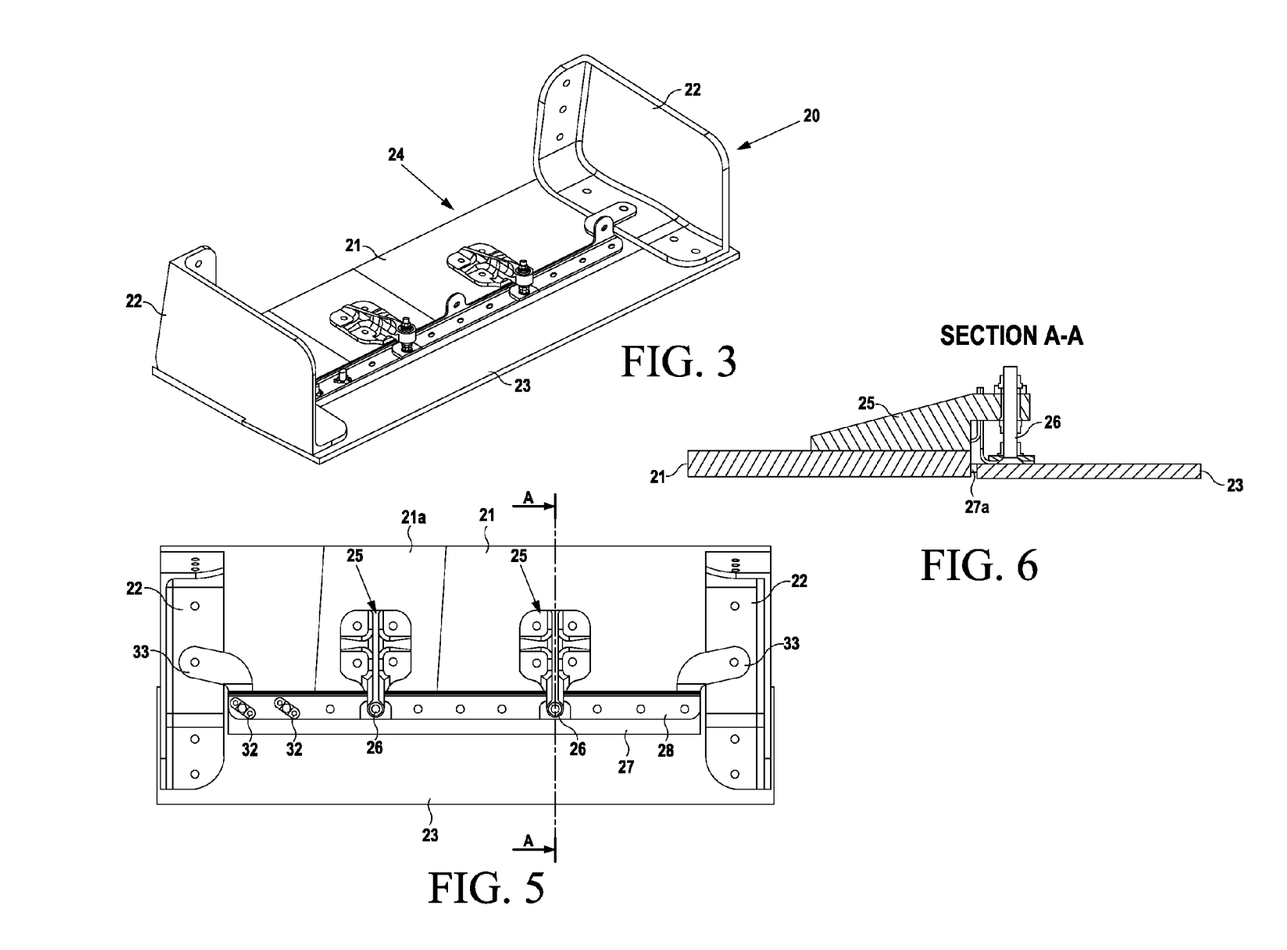
FIG. 3 illustrates a joint including the coupling assembly in accordance with a first embodiment.
FIG. 5 illustrates the joint of FIG. 3 in plan view.
FIG. 6 illustrates the section cut A-A of FIG. 5.

FIG. 3 shows part of the trailing edge 20 of an aircraft wing. A lower wing cover 21 is attached to ribs 22, and the ribs 22 and the lower wing cover 21 are connected to a rear spar (not shown). A trailing edge panel 23 is also attached to the ribs 22. To achieve a smooth aerodynamic surface, the external surface of the panel 23 and the external surface of the cover 21 must be aligned with each other within a strict tolerance range. In place of a conventional butt-strap, a coupling assembly 24 is used to join the panel 23 to the cover 21.

Figure 4:
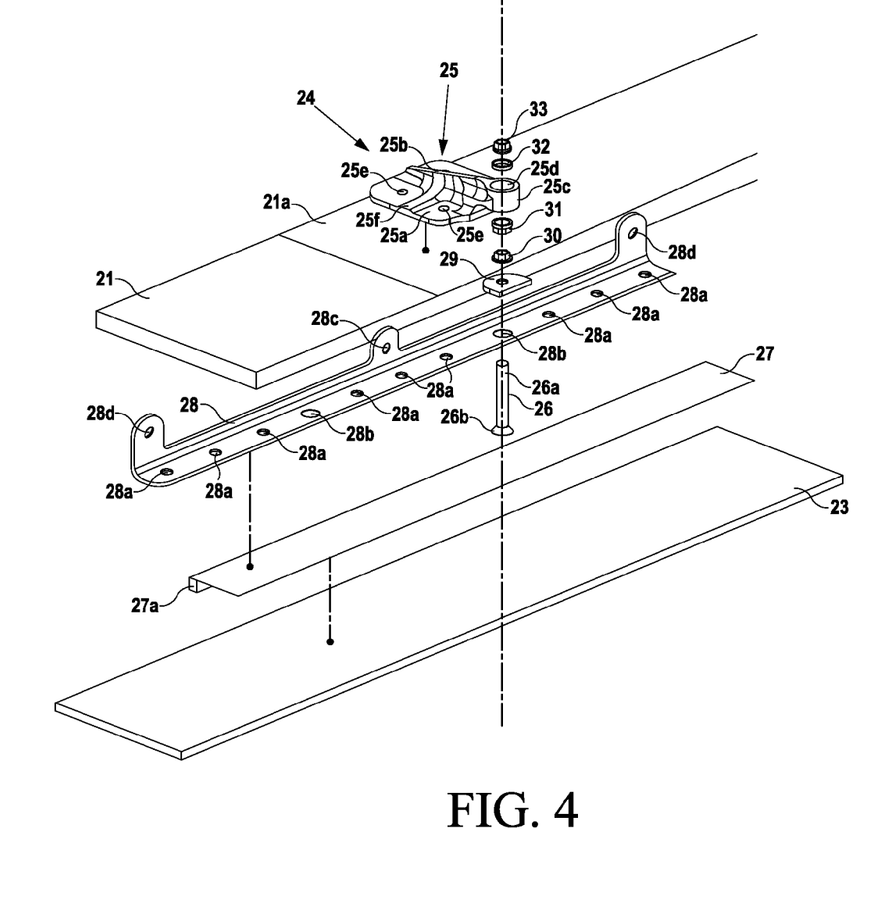
FIG. 4 illustrates an exploded view of the joint of FIG. 3.

As best shown in FIG. 4, the coupling assembly 24 includes a bracket 25, a bolt 26, a seal member 27, an L-shaped stiffener 28, a washer 29, a locknut 30, a spherical nut 31, a spherical washer 32 and a spherical nut 33.

The bracket 25 includes a mounting plate 25a, a bracket arm 25b extending from the mounting plate 25a, and a head 25c having a through bore 25d on the bracket arm 25b. The mounting plate 25a has four fixing holes 25e. The mounting plate 25a is fixed to the lower wing cover 21 through use of fasteners (not shown) which pass through the mounting holes 25e. Since the bracket 25 is mounted upon a locally planar surface of the lower wing cover 21, the mounting plate 25a is planar. The bracket arm 25b extends from the mounting plate 25a and is supported by supporting ribs 25f. The head 25c beneficially overhangs the mounting plate 25a so that the shaft 26 can be received in the through bore 25d of the head 25c.

The L-shaped stiffener 28 has a series of fastening holes 28a, through which fasteners 32 are disposed to fasten the L-shaped stiffener 28 to the panel 23. Two such fasteners 32 are shown in position in FIG. 5 for illustration purposes only, but the fasteners 32 would be provided in each fixing hole 28a. The L-shaped stiffener 28 also includes countersunk holes 28b to receive the countersunk head 26b of the bolt 26. The L-shaped stiffener 28 therefore serves to connect the shaft 26a of the bolt 26 to the panel 23. The L-shaped stiffener 28 also includes a lug 28c used as a systems link. The lug 28c is disposed substantially centrally along the length of the L-shaped stiffener 28. The L-shaped stiffener 28 also includes, at each end, a connecting lug 28d fastened to a corner bracket 33. The other end of the bracket 33 is fastened to the rib 22.

The seal member 27 includes a compressible "P-shaped" flange extending along one edge of the seal member. The seal member 27 is disposed between the L-shaped stiffener 28 and the panel 23 and the fasteners 32 pass through the seal member 27 to secure it in position. The P-shaped flange 27a seals the gap between the cover 21 and the panel 23.

The panel 23 is joined to the cover 21 as follows. The panel 23 is supplied as a sub-assembly comprising the panel 23, the seal member 27, the L-shaped stiffener 28, the fasteners 32

(fastening the L-shaped stiffener 28 and the seal member 27 to the panel 23), the bolt 26 (disposed through the L-shaped stiffener 28), the washer 29, and the lock nut 30 secured in position on the shaft 26a of the bolt 26. The bracket 25, the spherical washer 32, and the spherical nuts 31 and 33, are supplied as loose items. An aircraft wing subassembly includes the ribs 22,22 fastened to the lower wing cover 21.

The panel subassembly is offered up and positioned with respect to the ribs 22. A tooling spherical nut (not shown) is threaded onto the shaft 26a of the bolt 26 to a nominal position and the bracket 25 is positioned on the inner surface of the cover 21. The outer surface of the panel 23 is aligned with the outer surface of the cover 21 within an aerodynamic step tolerance. With the bracket 25 positioned on the inner surface of the cover 21 the tooling spherical nut is adjusted to sit in a recess 25g (see FIGS. 10a, 10b) formed in the lower face of the head 25c around the bore 25d. The recess 25g is spherical to match the spherical surface of the tooling nut.

With the bracket 25 now positioned correctly with respect to the inner surface of the cover 21, the fixing holes 25e are transferred from the coupling bracket 25 into the cover 21. Pilot holes are drilled through the cover 21 from the inner surface and then full size holes are drilled from the outside surface of the cover 21. The panel sub assembly and bracket 25 are removed. The fixing holes in the cover 21 are finished by forming countersinks in the outer surface of the cover 21 followed by reaming and deburring the holes formed. The bracket 25 is then secured in position on the cover 21 using countersunk fasteners. The tooling nut is removed from the bolt 26 and replaced with the production spherical locking nut 31 in exactly the same position with respect to the shaft 26a. The panel subassembly is then positioned once again with respect to the ribs 22 with the shaft 26a passing through the through bore 25d in the bracket 25. The spherical washer 32 is positioned on a flat upper surface 25h of the bracket head 25c and the second spherical locking nut 33 is tightened on the shaft 26a.

The coupling brackets 25 are positioned intermediate the ribs 22 and a plurality of spaced coupling brackets 25 are installed between adjacent ribs 22.

Due to the variation in span-wise load across the wing the thickness of the cover 21 also varies across the wing. The inner surface of the cover 21 therefore includes a ramped region 21a at particular points across the span. A typical ramp 21a has an incline of 1:40. Due to the positioning of the brackets 25 between the ribs 22, the brackets 25 sometimes need to be installed on the ramped surface 21a. This would not be possible were it not for the spherical bearing surfaces of the nuts 31 and 33 and the washer 32. These spherical bearing surfaces, together with a clearance between the outer diameter of the shaft 26a and the inner diameter of the through bore 25d, act to accommodate the ramped surface 21a.

Figure 7:
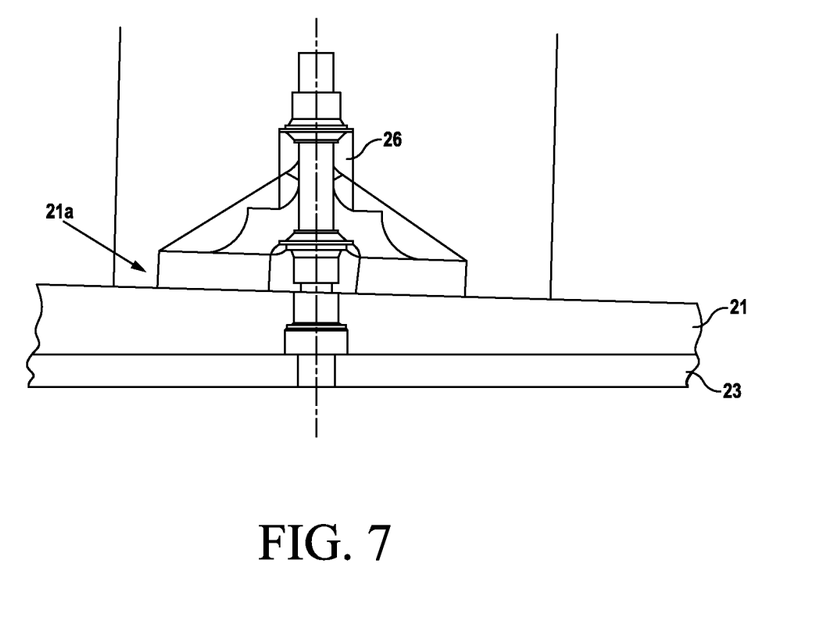
FIG. 7 illustrates the angularity accommodated by the coupling assembly.
Figure 8A:
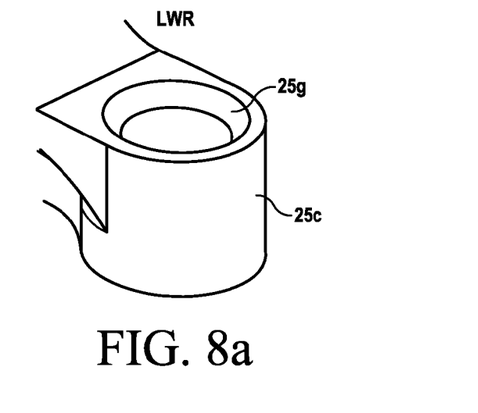
FIGS. 8a and 8b illustrate the upper and lower faces, respectively, of the bracket head in accordance with the first embodiment.
Figure 8B:
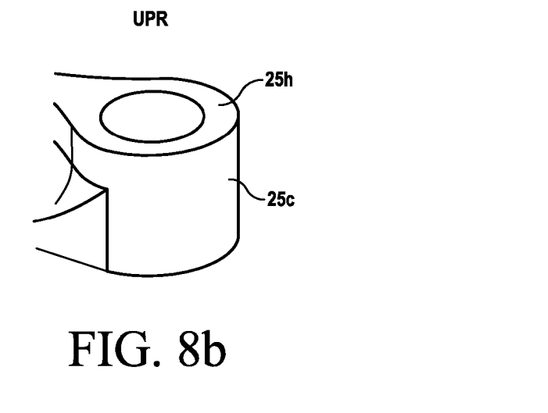

As best shown in FIG. 7, the shaft 26a maintains an axis perpendicular to the outer surface of the panel 23, whilst the bracket 25 is oriented normal to the ramped surface 21a. The spherical nuts 31 and 33 necessarily are aligned with the axis of the shaft 26a, whilst the upper and lower faces of the bracket head 25c are aligned with the ramped surface 21a. Therefore, the axis of the shaft 26 is not aligned with the axis of the through bore 25d and the angularity is washed out by the spherical bearing surfaces of the washer 32 and nut 33 on the upper surface of the head 25c, and by the spherical bearing surfaces of the recess 25g and the nut 31 on the lower surface of the head 25c.

Not only do these spherical bearing surfaces accommodate the ramped surface 21a, but they also accommodate a difference between the angle of the local surface of the cover 21 and the panel 23 in the chord-wise direction. Therefore, the spherical bearing surfaces accommodate tilting of the shaft 26a with respect to the head 25c about a central point in two orthogonal directions. The degree of angularity which may be washed out in each of two of these orthogonal directions is typically up to 3°-6°. No packing or shimming is required to achieve the stringent aerodynamic step tolerances required between the outer surfaces of the cover 21 and the panel 23. This contrasts with a conventional butt-strap where packing and shimming is required. This step tolerance is typically +/−0.8 mm for the lower wing surface.

The locking nuts 31 and 33 act as an initially adjustable setting device and act between the head 25c and the shaft 26a for setting the position of the shaft with respect to the head in the axial direction of the shaft. The spherical bearing surfaces allow self alignment of the locking nuts 31 and 33 to accommodate the tilting of the shaft 26a with respect to the head 25c. The coupling assembly can therefore achieve the desired aerodynamic step tolerance and the local geometry can be accommodated using a standard set of parts which may be used across the entire span of the wing trailing edge, without the requirement for any bespoke parts. This provides distinct advantages over the conventional prior art butt-straps which are either individual bespoke components and/or require significant packing and shimming. The coupling assembly therefore provides significant savings by reducing part count and final assembly time.

In service, the lower trailing edge panel 23 may be removed for inspection by removing the fasteners 32 which attach the L-shaped stiffener 28 to the panel 32. Note that the L-shaped stiffener 28 is never removed with the panel 32 so that the aerodynamic step tolerance is ensured upon reattachment of the panel 23.

The cover 21 and the panel 23 are each of composite construction of laminated carbon fibre reinforced plastic plies. However, it will be appreciated by those skilled in the art that other composite or metallic materials may be used. Where composite covers and panels are used, it is necessary to create a lightening path in the composite wing structure. Conventional butt-straps are typically of metallic material and form part of the lightning path. The coupling assembly, as a replacement for the conventional butt-strap, must also perform the function of forming part of the lightning path. To that end, the L-shaped stiffener 28 and the corner brackets 33 are metallic components. Alternatively, additional metallic components may be used to form the lightening path, where required.

In the first embodiment described above, the bracket 25 has a spherical washer 32 and spherical nut 33 co-operating with the upper surface 25h of the head 25c, and a spherical nut 31 co-operating with the spherical recess 25g formed in the lower head surface. The spherical bearing surfaces may, however, take a number of different forms.

Figure 9A:
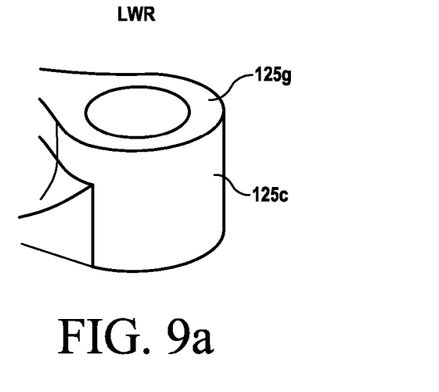
FIGS. 9a and 9b illustrate the upper and lower faces, respectively, of the bracket head in accordance with a second embodiment.
Figure 9B:
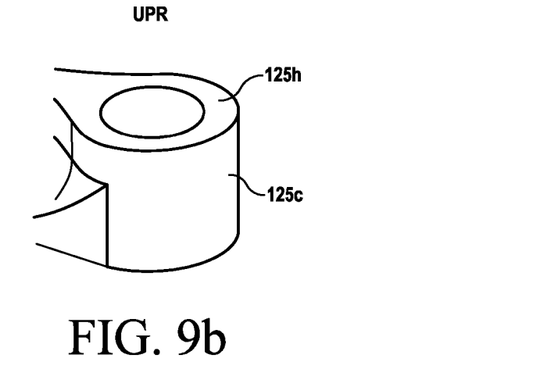

In a second embodiment the coupling assembly differs from the first embodiment only in that the bracket head 125c has a flat lower face 125g, instead of the spherical recess surface 25g. FIGS. 9a and 9b depict the lower and upper head surfaces respectively. In this second embodiment, a second spherical washer similar to the spherical washer 32 is disposed between the lower head surface 125g and the spherical nut 31. The upper head surface 125h is similar to the upper head surface 25h.

Figure 10A:
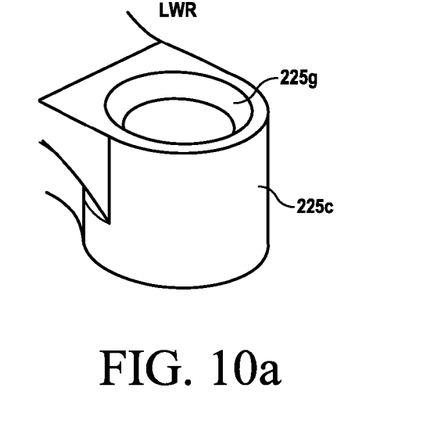
FIGS. 10a and 10b illustrate the upper and lower faces, respectively, of the bracket head in accordance with a third embodiment.
Figure 10B:
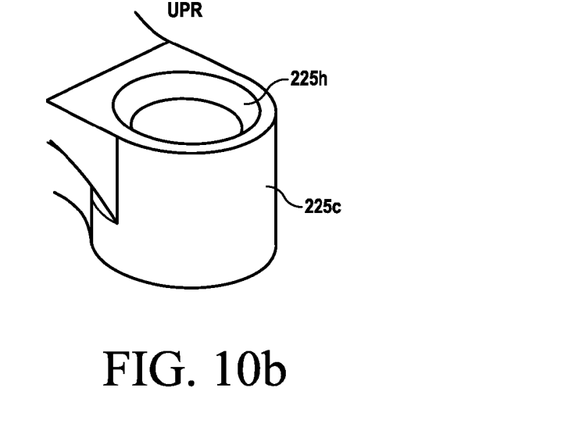
Figures 11A, 11B:
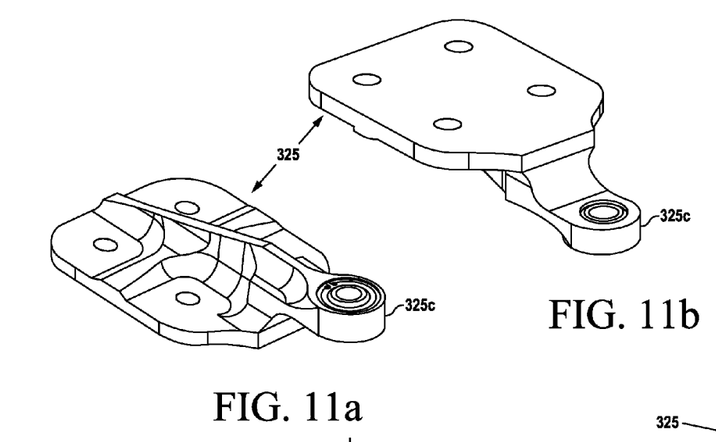
Figure 11C:
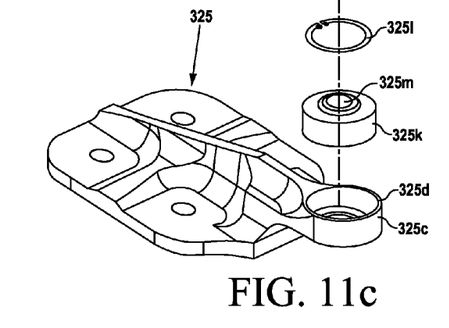
Figure 11D:
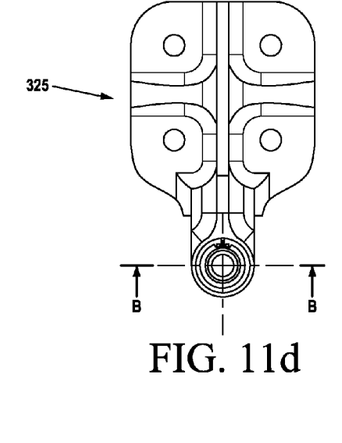
Figure 11E:
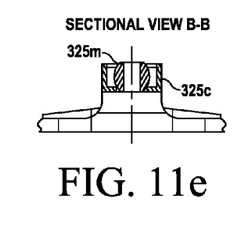
Figure 11F:
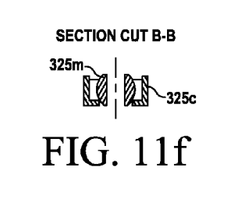

In a third embodiment, the coupling assembly is identical to the first embodiment with the exception that the flat upper head surface 25h is replaced by a spherical recess surface 225h. A spherical recess surface 225g is formed on the lower head surface similar to the recess surface 25g. FIGS. 10a and 10b illustrate the lower and upper surfaces of the head of the bracket in the third embodiment.

Whilst in the first to third embodiments described above the spherical bearing surfaces are formed in various spherical nuts and washer, in a fourth embodiment the bracket head 325c has an enlarged through bore 325d, which receives a spherical bearing 325k held in place by a bearing clip 325l. The spherical bearing 325k has an inner through bore 325m which receives the shaft 26a of the bolt 26. FIGS. 11a-11e illustrate the bracket of the fourth embodiment in detail. The spherical bearing 325k is rotatable with respect to the bracket head 325c about a central point in two orthogonal directions. The degree of angular rotation in these two directions is up to 3°-6°, similar to that for the first to third embodiments. The inner through bore 325m of the spherical bearing 325k is dimensioned so as to provide a clearance tolerance fit with the thread of the shaft 26a. In this way, the axis of the spherical bearing through bore 325m is aligned with the axis of the shaft 26a. Note that in the first to third embodiments, the axis of the through bore 25d may not necessarily be aligned with the axis of the shaft 26a.

Figure 12A:
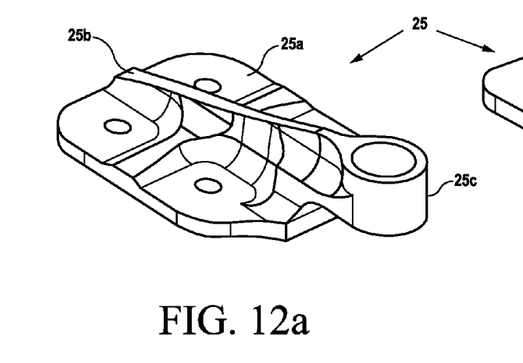
FIG. 12a illustrates the bracket of the first embodiment viewed from above; and 12b illustrates the view from beneath.
Figure 12B:
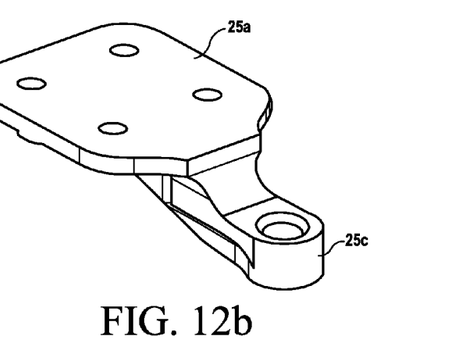

FIGS. 12a and 12b illustrate the bracket 25 of the first embodiment. The mounting plate 25a of the bracket 25 of the first embodiment is generally planar and shaped so as to match with the local surface geometry of the inner surface of the lower wing cover 21. However, it will be appreciated that the principles of the coupling assembly in accordance with this invention may be employed for other purposes than connecting an aircraft lower wing cover to an aircraft lower trailing edge panel.

Figure 13A:
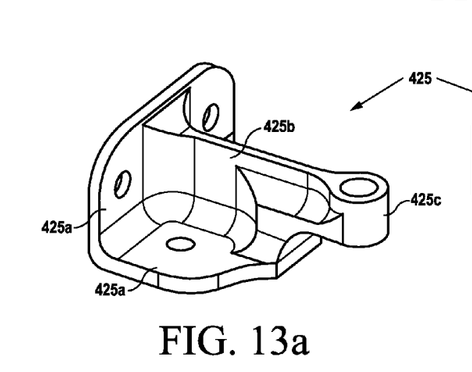
FIG. 13a illustrates a bracket of a fifth embodiment viewed from above; and 13b illustrates the view from beneath.
Figure 13B:
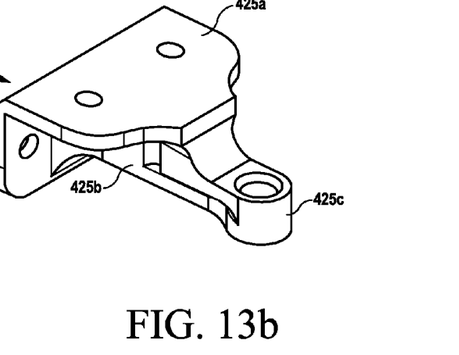

In a fifth embodiment, the coupling assembly includes a corner bracket 425, as shown in FIGS. 13a and 13b. The corner bracket 425 is similar to bracket 25 of the first embodiment, with the exception that the mounting plate 425a is adapted to be secured into a corner, rather than onto a planar surface. The bracket arm 425b is shaped so as to support the bracket head 425c from the mounting plate 425a. The bracket of the coupling assembly in accordance with the fifth embodiment may be mounted, for example, to the interface between a wing spar and wing cover, and used for coupling between the wing spar/cover and a wing panel.

Figure 14:
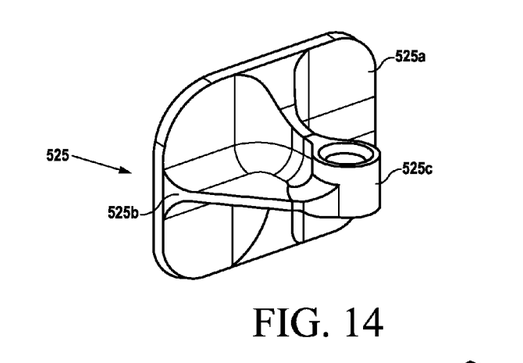
FIG. 14 illustrates a bracket of a sixth embodiment viewed from above.

In a sixth embodiment as shown in FIG. 14 the coupling assembly includes a bracket 525 having a mounting plate 525a for a fixing to a surface substantially parallel with the axis of the through bore formed in the head 525c. The bracket arm 525b extends between the mounting plate 525a and the bracket head 525c. The coupling assembly in accordance with the sixth embodiment may be used, for example, where the bracket 525 is to be connected to a substantially vertical surface, such as an aircraft wing spar or rib, and used for coupling the wing spar or rib to a wing panel.

Various other bracket configurations are envisaged within the scope of the present invention and may be used to join other aircraft components. Examples include: the joint between a fixed leading edge panel and a cover of a vertical tail plane, a horizontal tail plane, or a wing; the joint between a trailing edge panel and a cover of a vertical tail plane, or a horizontal tail plane; the joint between a wing cover and a wing tip; and the joints in a landing gear bay. The coupling assembly may also be used to join non aircraft components.

In the first to sixth embodiments described above, the shaft is that of a bolt, the bolt having a head which may be used to connect the shaft to the panel 23. Alternatively, the shaft may be integrally formed with a second mounting plate (not shown) for connecting to the panel 23. The mounting plate could have fixing holes for receiving fasteners for connecting the second mounting plate to the cover 23.

In each of the embodiments described above, locking nuts are used to set the position of the shaft with respect to the head in the axial direction of the shaft. However, as an alternative to the threaded locking nuts, another setting device operable to act between the head and shaft may be employed, such as a collar and a pin disposed through the collar and a hole formed in the shaft substantially perpendicular to the shaft axis. The hole in shaft may be drilled following adjustment of the shaft to a desired position with respect of the head, prior to pinning. In this alternative example, the shaft would not need to be threaded.

Although the invention has been described above with reference to one or more preferred embodiments, it will be appreciated that various changes or modifications may be made without departing from the scope of the invention as defined in the appended claims.

The invention claimed is:

1. An aircraft assembly comprised of an aircraft skin cover, an aircraft edge panel adjacent said cover and a coupling assembly for joining said cover to said panel, the coupling assembly comprising:
 a shaft for connecting to said edge panel;
 a bracket including a mounting plate for connecting to said skin cover, a bracket arm extending from the mounting plate, and a head having a through-bore on the bracket arm, the shaft being received in the through-bore; and
 a setting device configured to act between the head and the shaft and to adjust and set the position of the edge panel with respect to the skin cover in the axial direction of the shaft, wherein the coupling assembly includes at least one spherical bearing surface configured to permit self-alignment of the setting device and to accommodate tilting of the shaft with respect to the head about a central point in two orthogonal directions.

2. An aircraft assembly according to claim 1, wherein a spherical recess is formed in the head around the periphery of the bore on one or each end of the bore, the recess having the spherical bearing surface.

3. An aircraft assembly according to claim 1, wherein a spherical washer is received on the head around the periphery of the bore on one or each end of the bore, the spherical washer having the spherical bearing surface.

4. An aircraft assembly according to claim 2, wherein the head has the recess formed around one end of the bore, and the head receives the spherical washer around the other end of the bore.

5. An aircraft assembly according to claim 1, wherein a spherical bearing is received in the bore and held in place by a bearing clip, the spherical bearing having the spherical bearing surface and an inner through-bore which receives the shaft.

6. An aircraft assembly according to claim 1, wherein the setting device is one or more nuts threadably received on the shaft.

7. An aircraft assembly according to claim 1, wherein the mounting plate has one or more fixing holes for receiving respective fasteners for connecting said mounting plate to the skin cover.

8. An aircraft assembly according to claim 1, wherein the mounting plate is planar or L-shaped.

9. An aircraft assembly according to claim 1, wherein the shaft is of a bolt having a head connected to the edge panel.

10. An aircraft assembly according to claim 1, wherein the shaft is integrally formed with a second mounting plate connected to the edge panel.

11. An aircraft assembly according to claim 1, wherein the setting device is configured to set the position of the edge panel with respect to the skin cover in a fixed spatial arrangement.

12. An aircraft lifting surface comprising a first component joined to a second component by at least one coupling assembly, said at least one coupling assembly comprising:
    a shaft for connecting to said first component;
    a bracket including a mounting plate for connecting to said second component, a bracket arm extending from the mounting plate, and a head having a through-bore on the bracket arm, the shaft being received in the through-bore; and
    a setting device configured to act between the head and the shaft and set the position of the first component with respect to the second component in the axial direction of the shaft, wherein the coupling assembly includes at least one spherical bearing surface, said bearing surface is configured to permit self-alignment of the setting device and to accommodate tilting of the shaft with respect to the head about a central point in two orthogonal directions.

13. An aircraft lifting surface according to claim 12, wherein the first and second components have flush surfaces across the joint.

14. An aircraft lifting surface according to claim 12, wherein the first component is a wing trailing edge panel and the second component is a wing cover.

15. An aircraft lifting surface according to claim 12, wherein at least one of the first component and the second component has a ramped surface and the coupling assembly is connected at the ramped surface.

16. An aircraft lifting surface according to claim 12, wherein the setting device is configured to set the position of the first component with respect to the second component in a fixed spatial arrangement.

17. A method of forming an aircraft lifting surface according to claim 12, the method comprising:
    connecting the shaft to the first component;
    connecting the mounting plate of the bracket to the second component;
    inserting the shaft in the through-bore of the bracket head; and
    adjusting and setting the position of the shaft with respect to the head in the axial direction of the shaft to adjust and set the position of the first component relative to the second component, whereby the at least one spherical bearing surface permits self-alignment of the setting device to accommodate tilting of the shaft with respect to the head about a central point in two orthogonal direction.

18. A method according to claim 17, the method comprising adjusting and setting the position of the shaft with respect to the head in the axial direction of the shaft to adjust and set the position of the first component relative to the second component in a fixed spatial relationship.

* * * * *